United States Patent
Liang et al.

(10) Patent No.: US 12,429,943 B2
(45) Date of Patent: Sep. 30, 2025

(54) EFFECT DISPLAY METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventors: Yahan Liang, Beijing (CN); Xubin Zhou, Beijing (CN); Yimin Ke, Beijing (CN); Hua Long, Beijing (CN); Fei Yu, Beijing (CN); Yishu Zeng, Beijing (CN); Haishan Liu, Beijing (CN); Jiacheng Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/783,864

(22) Filed: Jul. 25, 2024

(65) Prior Publication Data
US 2024/0377880 A1    Nov. 14, 2024

Related U.S. Application Data

(63) Continuation of application No. PCT/CN2023/072052, filed on Jan. 13, 2023.

(30) Foreign Application Priority Data

Jan. 25, 2022    (CN) .......................... 202210088012.9

(51) Int. Cl.
G06F 3/01    (2006.01)
(52) U.S. Cl.
CPC .............. G06F 3/011 (2013.01); G06F 3/017 (2013.01)
(58) Field of Classification Search
CPC . G06F 3/011; G06F 3/017; G06F 3/00; G06F 30/25; A63F 13/52; A63F 13/213;
(Continued)

(56) References Cited

U.S. PATENT DOCUMENTS

| 2014/0149903 A1 | 5/2014 | Ahn et al. |
| 2016/0096612 A1 | 4/2016 | Longmier et al. |

(Continued)

FOREIGN PATENT DOCUMENTS

| CN | 105824426 A | 8/2016 |
| CN | 111240482 A | 6/2020 |

(Continued)

OTHER PUBLICATIONS

China National Intellectual Property Administration, Office Action Issued in Application No. 202210088012.9, Mar. 23, 2023, 12 pages.

(Continued)

Primary Examiner — Matthew A Eason
Assistant Examiner — Chayce R Bibbee
(74) Attorney, Agent, or Firm — Alleman Hall & Tuttle LLP

(57) ABSTRACT

The present disclosure relates to a special effect display method and apparatus, a device, a storage medium, and a program product. The method comprises: setting a physical property of a target effect object, wherein the physical property comprises a gravity parameter of the target effect object; determining a current position and a target position of the target effect object; determining a floating force parameter based on the current position and the target position; and controlling the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

18 Claims, 3 Drawing Sheets

(58) Field of Classification Search
CPC . G06T 7/70; G06T 2207/30201; G06T 13/60; G06T 13/20; G06T 2210/56; G06T 15/005; G06T 19/006; G06T 19/20; G06V 40/161; G06V 40/174; G06V 40/171

See application file for complete search history.

(56) References Cited

U.S. PATENT DOCUMENTS

| | | | | |
|---|---|---|---|---|
| 2016/0189493 | A1* | 6/2016 | Rihn | G06T 15/00 340/407.1 |
| 2016/0350981 | A1* | 12/2016 | Luo | G06F 3/0488 |
| 2017/0249009 | A1* | 8/2017 | Parshionikar | G06F 3/017 |
| 2019/0286232 | A1* | 9/2019 | De Nardi | G06F 3/017 |
| 2019/0325631 | A1* | 10/2019 | Cao | G06T 7/73 |
| 2022/0266160 | A1 | 8/2022 | Wang | |
| 2022/0284597 | A1 | 9/2022 | Zhuge et al. | |
| 2022/0397759 | A1* | 12/2022 | Vignau | G06F 3/0346 |
| 2024/0216802 | A1 | 7/2024 | Zheng et al. | |

FOREIGN PATENT DOCUMENTS

| | | |
|---|---|---|
| CN | 111340211 A | 6/2020 |
| CN | 111760265 A | 10/2020 |
| CN | 112887631 A | 6/2021 |
| CN | 114494658 A | 5/2022 |
| JP | 2007202695 A | 8/2007 |
| WO | 2020115452 A1 | 6/2020 |
| WO | 2020256330 A1 | 12/2020 |

OTHER PUBLICATIONS

ISA China National Intellectual Property Administration, International Search Report Issued in Application No. PCT/CN2023/072052, Apr. 20, 2023, WIPO, 5 pages.
"Blowing bubbles" video screenshots from Douyin (app), video published Apr. 29, 2019, 1 page.
European Patent Office, Extended European Search Report Issued in Application No. 23745999.5, Mar. 6, 2025, Germany, 8 pages.
Japan Patent Office, Office Action Issued in Application No. 2024-544387, Jul. 22, 2025, 7 pages.

* cited by examiner

EFFECT DISPLAY METHOD AND APPARATUS, DEVICE, STORAGE MEDIUM, AND PROGRAM PRODUCT

CROSS-REFERENCE TO RELATED APPLICATIONS

This application is based on and claims the benefit of priority to the Chinese patent application No. 202210088012.9 filed on Jan. 25, 2022, which is hereby incorporated by reference in its entirety into the present application.

TECHNICAL FIELD

The present disclosure relates to the field of computer technology, in particular to an effect display method and apparatus, a device, and a storage medium.

BACKGROUND

With a rapid development of the Internet technology and the terminal equipment, various terminal equipment such as mobile phone and tablet computer, etc., has become an indispensable part of people's work and life. Functions of various media software installed in smart terminals are becoming more and more powerful. For example, an operation on an effect object can be achieved through media software installed in a smart terminal. Based on such software, demands for real materials can be reduced, costs can be saved, and operation results can be easily counted.

SUMMARY

According to some embodiments of the present disclosure, an effect display method is provided, comprising:
  setting a physical property of a target effect object, wherein the physical property comprises a gravity parameter of the target effect object;
  determining a current position and a target position of the target effect object;
  determining a floating force parameter based on the current position and the target position; and
  controlling the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

According to other embodiments of the present disclosure, an effect display apparatus is provided, comprising:
  a physical property setting module configured to set a physical property of a target effect object, wherein the physical property comprises a gravity parameter of the target effect object;
  a position determining module configured to determine a current position and a target position of the target effect object;
  a floating force parameter determining module configured to determine a floating force parameter based on the current position and the target position;
  a floating control module configured to control the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

According to another embodiments of the disclosure, an electronic device is provided, the electronic device comprising:
  one or more processors;
  a storage device, for storing one or more programs;
  when the one or more programs are executed by the one or more processors, cause the one or more processors to implement the effect display method as described in any of the aforementioned embodiments.

According to further embodiments of the present disclosure, a non-transitory computer-readable storage medium is provided, in which a computer program is stored, wherein the program, when executed by a processor, cause the processor to implement the effect display method as described in any of the aforementioned embodiments.

BRIEF DESCRIPTION OF THE DRAWINGS

By combining the accompanying drawings and referring to the following detailed description, the above and other features, advantages, and aspects of each embodiment of the present disclosure will become more apparent. Throughout the drawings, the same or similar drawing reference signs indicate the same or similar elements. It should be understood that the accompanying drawings are schematic, and the original and elements may not necessarily be drawn in scale.

DETAILED DESCRIPTION

Figure 1:
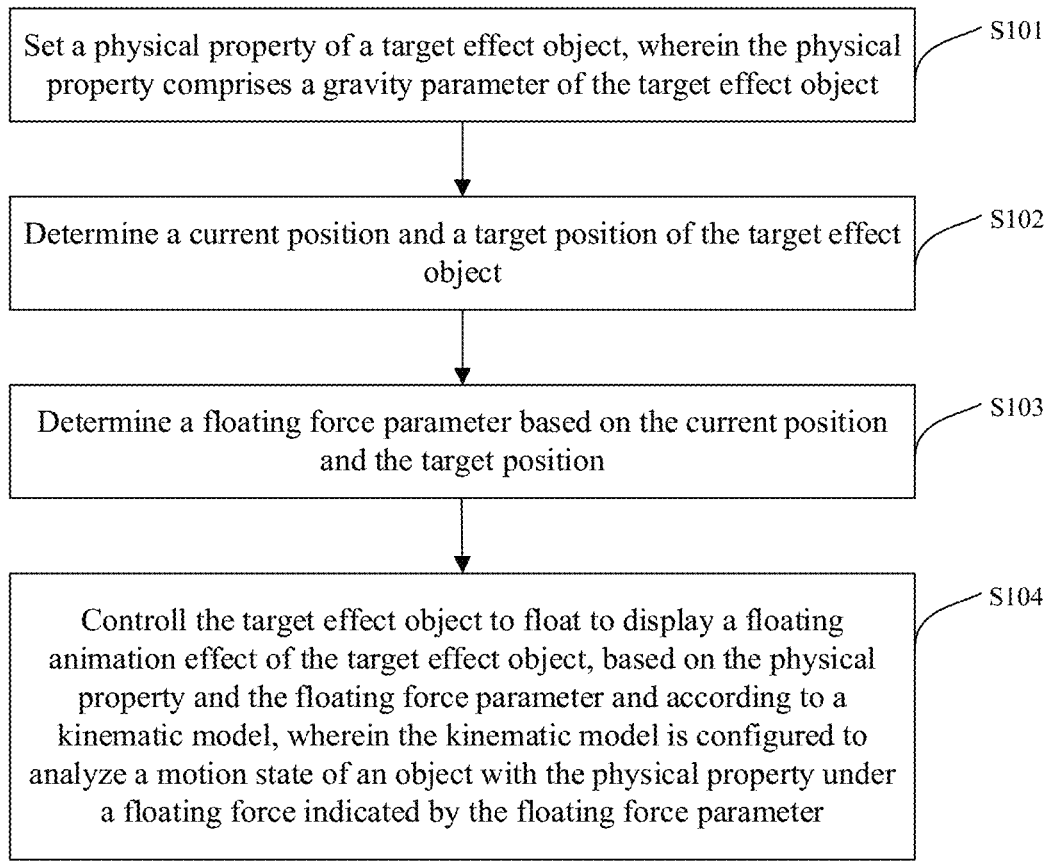
FIG. 1 is a flowchart of an effect display method provided in some embodiments of the present disclosure.

A more detailed description of the embodiments of the present disclosure will be provided below with reference to the accompanying drawings. Although certain embodiments of the present disclosure are shown in the accompanying drawings, it should be understood that the present disclosure can be implemented in various forms and should not be construed to be limited to the embodiments described herein. Instead, these embodiments are provided for a more thorough and complete understanding of the present disclosure. It should be understood that the accompanying drawings and embodiments of the present disclosure are for illustrative purposes only and are not intended to limit the protection scope of the present disclosure.

It should be understood that the various steps contained in the embodiments of the disclosed method can be executed in different orders and/or in parallel. In addition, implementation of the disclosed method may comprise additional steps and/or omit executing the shown steps. The scope of the present disclosure is not limited in this aspect.

The term "comprise" and its variations herein are non-exclusive, meaning "comprise but not limited to". The term "based on" means "at least partially based on". The term "one embodiment" means "at least one embodiment"; the term "another embodiment" means "at least one another embodiment"; the term "some embodiments" means "at least some embodiments". The related definitions of other terms will be provided in the following description.

It should be noted that the concepts such as "first" and "second" mentioned in the present disclosure are only used to distinguish different devices, modules or units, and are not intended to limit the order or interdependence of the functions performed by these devices, modules or units.

It should be noted that the modifiers of "one" and "multiple" mentioned in the present disclosure are illustrative rather than restrictive, and those skilled in the art should understand that they should be understood as "one or more" unless otherwise explicitly stated in the context.

The names of messages or information exchanged between multiple devices in the implementations of the present disclosure are for illustrative purposes only and are not intended to limit the scope of these messages or information.

The inventors have found that currently, most operations on effect objects lack integration into reality, and an experience of a user is not real.

The embodiments of the present disclosure provide an effect display method that by controlling a target effect object to move from an initial position to a target position, allows the target effect object to be displayed in a floating animation effect to achieve a floating effect of the target effect object and simulate an effect of a balloon movement, thereby enhancing an integration into reality and improving a real experience of a user. The effect display method proposed in the embodiments of the present disclosure is elaborated below in conjunction with the accompanying drawings.

FIG. 1 is a flowchart of an effect display method provided in some embodiments of the present disclosure, which is applicable to the case of adding effect props to an instant video. The method can be executed by an effect display apparatus which can be realized by using software and/or hardware and can be configured in an electronic device.

For example, the electronic device can be a mobile terminal, a fixed terminal or a portable terminal, such as a mobile phone, a site, an unit, a deceive, a multimedia computer, a multimedia tablet, an Internet node, a communicator, a desktop computer, a laptop computer, a notebook computer, a netbook computer, a tablet computer, a Personal Communication System (PCS) deceive, a personal navigation deceive, a Personal Digital Assistant (PDA), an audio/video player, a digital camera/camera, a positioning deceive, a television receiver, a radio broadcast receiver, an e-book deceive, a game deceive or any combination thereof, comprising accessories and peripherals of these deceives or any combination thereof.

For example, the electronic device can be a server, wherein the server can be either a physical server or a cloud server, and the server can be a server, or a server cluster.

As shown in FIG. 1, the effect display method provided in some embodiments of the present disclosure mainly comprises the following steps S101 to S104.

In step S101, a physical property of a target effect object is set, wherein the physical property comprises a gravity parameter of the target effect object.

The effect object can also be called an effect prop, which can be understood as a real operation object in a display scene corresponding to the real operation object. For example, the effect object can be a sugar figurine, which in some embodiments is a three-dimensional sugar figurine. The styles of the sugar figurines may be various, such as a rabbit style, a tiger style, a peacock style, a font style, a human style, etc. In the present embodiments, the styles of the three-dimensional sugar figurines are not limited. A tiger-style sugar figurine is taken as an example for explanation in below.

In some embodiments, the target effect object is referred to an effect object in a target state. In some embodiments, an effect object can be adjusted and changed according to a duration of completing a specified action by a user, and the target effect object is the effect object in a final state after adjustment. For example, if the effect object mentioned above is a sugar figurine, when a user makes duck face, blowing the sugar figurine is triggered, and as a time of making duck face by the user is increasing, the sugar figurine continues to grow. When the sugar figurine reaches a maximum state, the sugar figurine is determined to be in the target state, and the sugar figurine in the target state is determined as the target sugar figurine, namely the target effect object.

The physical property can be understood as a property parameter that is required to be set for the target effect object to simulate a real environment. In some embodiments, in order to achieve a floating effect, the above gravity parameter can be selected to be 0.

In addition, the physical property may also comprise: linear damping and angular damping, wherein the linear damping and the angular damping can be set based on an existence state of the effect object in the real environment, and will not be specifically limited in the present embodiment.

In step S102, a current position and a target position of the target effect object are determined.

The current position can be understood as a position of the target effect object in a current video frame obtained. The target position can be understood as a position that the target effect object will reach by floating, that is, after floating to the target position, the target effect object gradually becomes stationary.

The current position is determined by at least one of the following parameters: a floating force applied to the target effect object in a previous video frame; a first collision force generated by a face collision in the previous video frame; or a second collision force generated by an effect border collision in the previous video frame.

In some embodiments, the current position is determined based on aerodynamics by one or more parameters of the floating force applied to the target effect object in the previous video frame, the first collision force generated by the face collision in the previous video frame, and the second collision force generated by the effect border collision in the previous video frame. A specific determining method will not be limited in the present embodiment.

In some embodiments, the determining a target position of the target effect object comprises: determining a mouth position in an acquired facial image as an initial position of the target effect object; and determining the target position of the target effect object based on the initial position and a preset offset.

The initial position of the target effect object can be the mouth position in the facial image on a terminal screen.

In some embodiments, a facial image of a user is obtained, a feature extraction is performed to the facial image, and based on a result of feature extraction, a mouth image is determined from the facial image and the mouth image is determined on the terminal screen to determine the initial position of the target effect object.

In some embodiments, depth information of the facial image is obtained, based on which a 3D head model is established, a gravity center position and an offset of a mouth of the 3D head model is obtained (the offset between the gravity center position and the mouth of the 3D head model is known) to determine the position of the mouth of the user, and then to determine the initial position of the target effect object.

In some embodiments, the preset offset can be designed according to an actual situation, and the above preset offset can be a vector with direction and length. The above initial position can be represented by coordinates.

By adding the coordinates of the initial position with the preset offset, the target position can be obtained. The above target position is a position where the effect object gradually approaches and eventually stops and stays.

It should be noted that the target position is located near the face, but does not coincide with the 3D head model, to avoid blocking the face by the effect object.

In some embodiments, the method further comprises: generating the target effect object.

Specifically, a process of generating the target effect object mainly comprises: detecting whether a mouth of a target user has completed a specified action based on an acquired facial image; displaying an effect object in an initial state in response to the mouth of the target user completing the specified action; obtaining a keeping duration of completing the specified action by the mouth; adjusting a display state of the effect object based on the keeping duration; and generating the target effect object in response to the keeping duration reaching a preset duration.

In some embodiments, the facial image of the user is obtained by a camera of terminal equipment. The camera can be an external camera connected to the terminal equipment, or a built-in camera of the terminal equipment. The above connection can be wired or wireless, and is not limited in the present embodiment. The above built-in camera of the terminal equipment can be a front camera or a rear camera. In some embodiments, the above camera is the front camera of the terminal equipment. In this way, the user can view a dynamic effect of the effect object through a display screen of the terminal equipment, enhancing the user's experience.

The above specified action can be understood as making duck face, and a specific method for detecting the action of making duck face will not be elaborated anymore in the present embodiment.

In some embodiments, after obtaining the facial image, by detecting the facial image, whether the mouth of the user has completed the specified action is judged, that is, whether the user has completed making duck face is judged. Specifically, the detecting the facial image is also used to detect the position of the mouth of the user on the terminal screen.

For example, there are mainly two ways to determine the position of the mouth of the user. The first one is to perform a feature extraction from the above facial image, and based on a result of feature extraction, to determine an image of the mouth in the facial image and to determine the image of the mouth on the terminal screen. The second one is to obtain depth information of the facial image, based on which a 3D head model is established, and to obtain a gravity center position and an offset of the mouth of the 3D head model (the offset between the gravity center position and the mouth of the 3D head model is known) to determine the position of the mouth of the user.

In some embodiments, the above initial state can be understood as a state of the effect object when the user just makes duck face. In some embodiments, as a keeping duration of making duck face by the user is increasing, a display state of the effect object is constantly changing.

In some embodiments, the effect object can be divided into multiple stages, with different display states designed for the multiple stages to simulate a real changing process of the effect object in a real environment. By designing shapes for different stages, a realism of the effect object can be increased and a fun of user interaction can be improved.

In some embodiments, the display state of the effect object is determined based on the keeping duration of the specified action (i.e., making duck face) by the mouth. For example, an entire changing process of the effect object is designed to be 10 seconds, and a duration for each display state is designed based on a number of divided stages and a real changing process of the effect object. In addition, the above real changing process is presented at a speed of being first fast and then slow to restore a true rhythm.

In some embodiments, dividing the effect object into six stages is taken as an example for explanation. In stage 1: an effect object in an initial state is displayed when a user has made duck face for less than 1 second; in stage 2: the effect object in a first state is displayed when the user has made duck face for 1 to 2 seconds; in stage 3: the effect object in a second state is displayed when the user has made duck face for 2 to 4 seconds; in stage 4: the effect object in a third state is displayed when the user has made duck face for 4 to 8 seconds; in stage 5: the effect object in a fourth state is displayed when the user has made duck face for 8 to 9 seconds; stage 6: the effects object in a target state is displayed when the user has made duck face for 9 to 10 seconds. After 10 seconds, the effect object leaves a position of a mouth and floats around a face.

Figure 2:
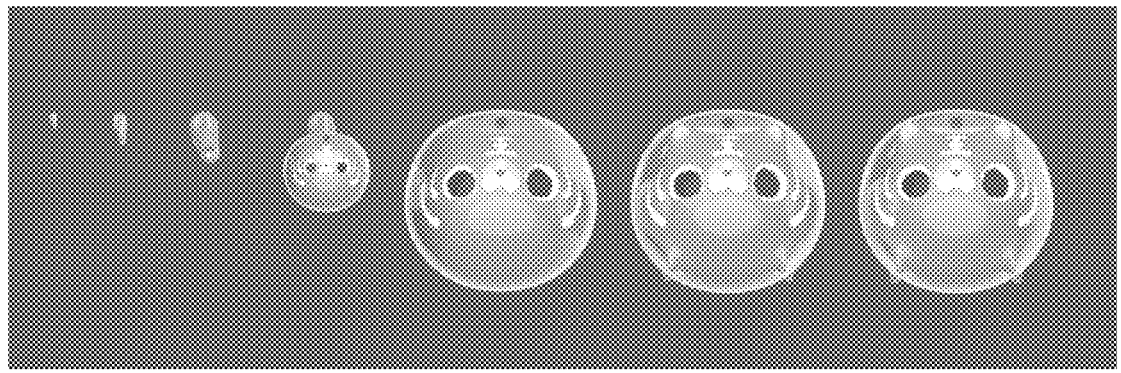
FIG. 2 is a schematic diagram of a display state of a sugar figurine provided in some embodiments of the present disclosure.

Illustratively, the effect object being a tiger-style sugar figurine is taken as an example for explanation. As shown in FIG. 2, the process of blowing a tiger-style sugar figurine is divided into 6 stages to simulate a real process of blowing the tiger-style sugar figurine. By designing shapes for different stages, a realism of blowing the tiger-style sugar figurine is increased and a fun of user interaction is improved. For example, stage 1, a tiger tail appears; stage 2: a tiger head appears slightly; stage 3: a shape of the tiger tail completely appears, and the tiger head becomes larger; stage 4: a tiger body appears; stage 5: an overall outline appears; stage 6: details such as tiger cars and limbs appear.

In some embodiments, according to a desired effect, appearance time points of the tiger-style sugar figurine in each stage are allocated and keyframes are assigned by a timeline of blendshape to improve a fluency of blowing the tiger-style sugar figurine and restore a true rhythm.

In some embodiments, after determining that a user has turned on an effect mode and detecting a facial image of the user, an effect border is displayed on a terminal screen to optimize a display effect of an effect.

In some embodiments, prompt information is also displayed on a terminal screen for reminding a target user to complete a specified action. For example, in a sugar figurine effect, the prompt information is "blow". In some embodiments, a progress bar may also be displayed on the terminal screen for prompting the user for a duration of completing the specified action. The progress bar is displayed above a facial image, and the above prompt information is displayed above the progress bar and at a starting position of the progress bar.

In some embodiments, the above prompt information constantly changes its position according to an actual progress of the progress bar. Specifically, as a keeping duration of making duck face by the target user keeps increasing, the progress bar slides continuously to the right, and a small bubble of "blow" follows vertices of the progress bar to move, meanwhile the sugar figurine starts to appear at a mouth of the target user. A display state of the sugar figurine is presented in stages according to the description in the above embodiments.

In some embodiments, the effect object in a current state is displayed in response to the keeping duration not reaching the preset duration and the mouth of the target user not completing the specified action; the prompt information is displayed, wherein the prompt information is configured to prompt the target user to continue completing the specified action.

Specifically, in response to the target user not making duck face for the preset duration, and no longer keeping an action of making duck face right now, the current state of the effect object is determined, in which the effect object is displayed at the mouth of the target user. Right now, the progress bar pauses, and the small bubble of "blow" changes to "continue to blow", accompanied by a zoom breathing animation.

In some embodiments, the facial image of the target user is detected in real-time to judge whether the action of making duck face is completed again. After completing the action of making duck face, the effect object continues to change from the current display state according to preset changing stages.

In some embodiments, after generating the target effect object, the effect border plays an expansion effect once with starlight twinkling. The effect object floats away from the mouth to an edge of the face, and a boom balloon sound effect is played.

In step S103, the floating force parameter is determined based on the current position and the target position.

In some embodiments, the floating force parameter comprises floating force direction and floating force magnitude. The floating force parameter is referred to the floating force direction and the floating force magnitude that need to be applied on each video frame.

In some embodiments, the floating force direction is obtained by the difference between the current position and the target position, and the floating force magnitude is preset.

In response to the current position coinciding with the initial position, a vector difference of the initial position and the target position is calculated, and a direction of the vector difference is determined as the floating force direction. The floating force magnitude is preset.

In some embodiments, each video frame is obtained in real-time and is configured as the current video frame to determine the current position of the target effect object in the current video frame. The floating force direction is determined based on the direction of the vector difference between the current position and the target position, and the floating force magnitude is determined by a preset force magnitude.

In step S104, the target effect object is controlled to float to display a floating animation effect of the target effect object, based on the physical property and the floating force parameter and according to a kinematic model, wherein the kinematic model is configured to analyze a motion state of an object with the physical property under a floating force indicated by the floating force parameter.

In some embodiments, the physical property is set on the target effect object and the floating force is applied towards the target position, causing the target effect object to float from the initial position to the target position, so as to display a floating animation effect on a terminal screen.

An effect achieved in a way is that the farther away the target position is, the greater an external force is, and the easier it is to push the target effect object to the target position; the closer the target position is, the smaller the external force is. In response to the target effect object floating to the target position and the target position remains unchanged, the target effect object slowly becomes stationary.

In some embodiments, a new target position is determined based on the target position and a preset offset after the target effect object moves to the target position. The floating force parameter is calculated based on the current position and the new target position in the current video frame to control the target effect object to float from the current position to the new target position, so that the target effect object is displayed in a floating animation effect.

In some embodiments, the new target position is located near the original target position. Namely, if the target position is slightly moved, the target effect object will oscillate back and forth near the target position until it comes to rest. A dynamic effect that the target effect object floats at the target position is related to values of the linear damping parameter of the target effect object. The smaller the linear damping is, the easier it is to oscillate back and forth, while the larger the linear damping is, the easier it is to stop, simulating air resistance.

Some embodiments of the present disclosure provide an effect display method and apparatus, a deceive, and a storage medium. The method comprises: obtaining an initial position of a target effect object, wherein the target effect object is referred to an effect object in a target state; determining a target position based on the initial position and a preset offset; controlling the target effect object to move from the initial position to the target position to display the target effect object in a floating animation effect. The embodiments of the present disclosure, by controlling the target effect object to move from the initial position to the target position so that the target effect object is displayed in the floating animation effect, to achieve a floating effect of the target effect object and simulate an effect of balloon movement, thereby enhancing the integration into reality and improving a real experience of the user.

On the basis of the above embodiments, the method further comprises: controlling the target effect object to rotate at an angular velocity, when controlling the target effect object to float, based on the physical property and the floating force parameter and according to the kinematic model.

Specifically, a process of determining the angular velocity comprises: obtaining a current angle of the target effect object in the current video frame; taking a difference of the current angle and a preset angle as an angle difference; and determining the angular velocity based on the angle difference and a preset velocity value.

In some embodiments, if the target effect object returns to a default angle when it is stationary, a force for restoring the default angle is required to be applied to the target effect object. However, there is no external force that only changes an angle of the target effect object. Therefore, a velocity is used to simulate, that is, a velocity to rotate towards a specified angle is given to the target effect object. For example, an angle difference dg between the current angle g0 of a model and a preset angle g1 is calculated and dg is multiplied by an appropriate preset velocity value as an angular velocity of the target effect object. In this way, a goal that the target effect object is continuously rotating towards a default direction is achieved.

On the basis of the above embodiments, the controlling the target effect object to float to display the floating animation effect of the target effect object, based on the physical property and the floating force parameter and according to the kinematic model comprises: detecting in real-time whether a head of a target user moves; and controlling the target effect object to follow the head of the target user to float, in response to detecting a head movement of the target user, based on the physical property and a new floating force parameter and according to the kinematic model, wherein the new floating force parameter is determined by a disturbance force parameter generated by the head movement of the target user.

In some embodiments, if a movement of a face of the target user is detected, the target effect object follows the face to move, resulting in realistic physical collision and air resistance effects.

Specifically, the new floating force parameter is determined by using the following method: determining a new target position based on the current position, a preset offset, and the disturbance force parameter; and determining the new floating force parameter based on the current position and the new target position.

In some embodiments, air surrounding a rapidly moving object follows the Bernoulli's principle, where a pressure decreases in an area with a faster air velocity, and an object will receive a force in a direction of a lower pressure. In real life, a following phenomenon demonstrates this principle: when a train runs quickly, a person near it will be drawn closer to the train by the air. When this principle is applied to a prop, the target effect object will approach to an area with a fast air velocity.

It can be understood that the original target position is p1, the initial position is p, and the preset offset is offset. It is obtained: $p1=p+offset$. A new spatial coordinate point is defined now, which is the new target position p5, $p5=p+offset \times 1/(q \times k)$; where k is an appropriate parameter. If a magnitude of a disturbance force when the head makes an air disturbance reaches a certain value, a new drift position point (the new target position) p5 is activated to achieve an effect that a balloon is drawn by a disturbance source when air is disturbed.

The method for determining the new floating force parameter based on the current position and the new drift point is same as the method for determining the floating force parameter in the above embodiments. Please refer to the description in the above embodiments for details, and the method will not be elaborated anymore in the present embodiment.

Specifically, the disturbance force parameter generated by the head movement of the target user is determined by using the following method: obtaining a first head position of the target user in a current video frame and second head positions of the target user in N video frames before the current video frame, wherein N is a positive integer; determining differences of the first head position and the second head positions as a position difference vector; determining a numerical value corresponding to the position difference vector as a magnitude of the disturbance force; and determining a direction of the position difference vector as a direction of the disturbance force.

In some embodiments, position information of the head of the target user is recorded frame by frame, and a difference between a first head position p3 of the target user in the current video frame and a second head position p4 of the target user in a video frame which is located 10 frames ahead of the current video frame is made to obtain a vector u1, which is determined as a direction and a magnitude of a wind generated for simulating a rapid head movement.

On the basis of the above embodiments, the method further comprises, before the detecting in real-time whether the head of the target user moves: determining a number of the target effect object; and in response to the number of the target effect object reaching a preset number, detecting in real-time whether the head of the target user moves.

The preset number can be designed according to an actual situation. In some embodiments, the above preset number is 4. When the number of the target effect object reaches 4, whether the face of the target user moves is detected. If the face of the target user moves, the 4 target effect objects are controlled to follow the face of the target user to move simultaneously. In this way, it can avoid having too few effect objects that affect a display effect, and also avoid too many effect objects blocking the face of the target user.

In some embodiments, after completing the preset number of the target effect objects, an expansion effect is displayed once on an effect border along with effects of starlight twinkling and ribbons falling off, the last sugar figurine leaves the mouth and floats to an edge of the face, and a boom balloon sound effect is played.

On the basis of the above embodiments, the embodiments of the present disclosure can also provide a method for generating a material of an effect object.

In some embodiments, the method for generating the material of the effect object mainly comprises: blending a pre-acquired MatCap (Material Capture) map and a pre-acquired PBR (Physically-Based Rendering) material map to obtain a final blended map; and adding a transparency effect and a lighting effect to the final blended map to obtain the effect object.

Specifically, the MatCap map comprises: a MatCap candy map, a MatCap detail map, and a MatCap highlight map;

In some embodiments, the blending the pre-acquired MatCap map and the pre-acquired PBR material map to obtain the final blended map comprises: blending the PBR material map with the MatCap detail map to obtain a first blended map; blending the first blended map with the MatCap highlight map to obtain a second blended map; and blending the second blended map with the MatCap candy map to obtain the final blended map.

In some embodiments, different color values are set for different channels in a color model to obtain the MatCap candy map, the MatCap detail map, and the MatCap highlight map.

In some embodiments, during the process of blending MatCap map and PBR material map, different weight values can be assigned to the PBR material map, the MatCap candy map, the MatCap detail map, and the MatCap highlight map to make a blended effect object more realistic, wherein the weight values are obtained by input of designers.

Figure 3:
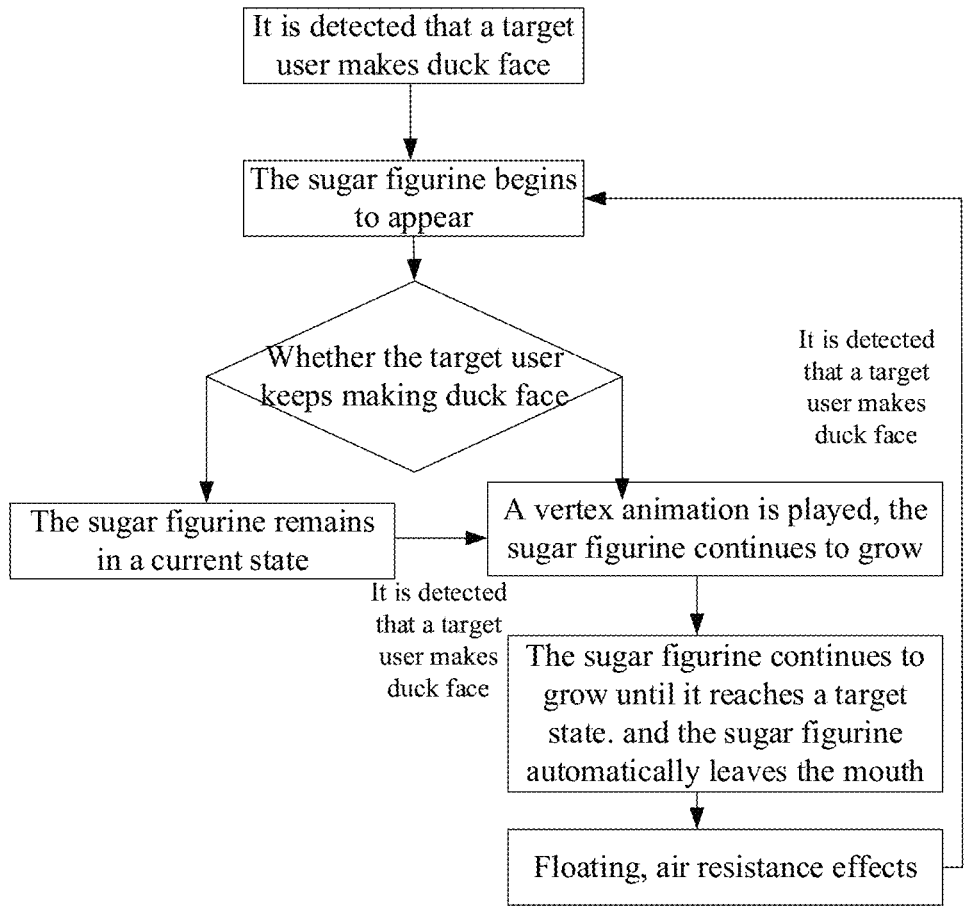
FIG. 3 is a flowchart of displaying a sugar figurine effect provided in some embodiments of the present disclosure.

On the basis of the above embodiments, the present disclosure provides a method for displaying a tiger-style sugar figurine. As shown in FIG. 3, when it is detected that a target user makes duck face, blowing the sugar figurine is triggered, indicating that the sugar figurine begins to appear. When it is detected that the target user keeps making duck face, a vertex animation is played, and the sugar figurine continues to grow until it reaches a target state. After that, the sugar figurine automatically leaves the mouth and floats to a preset position near the face, and then follows the face to move with air resistance and dynamic effects. If the making duck face is stopped before the sugar figurine is blown to the target state, the sugar figurine will remain in a current state, and a prompt will appear at a progress bar to prompt the user to continue blowing and won't disappear until the target user makes duck face again, and the sugar figurine will continue to grow till it changes to the target state. After that, the sugar figurine automatically leaves the mouth, and floats to the preset position near the face, and follows the face to move with air resistance and dynamic effects. Then, whether the target user makes duck face is detected, upon detecting that the target user makes duck face, blowing next sugar figurine is triggered.

Figure 4:
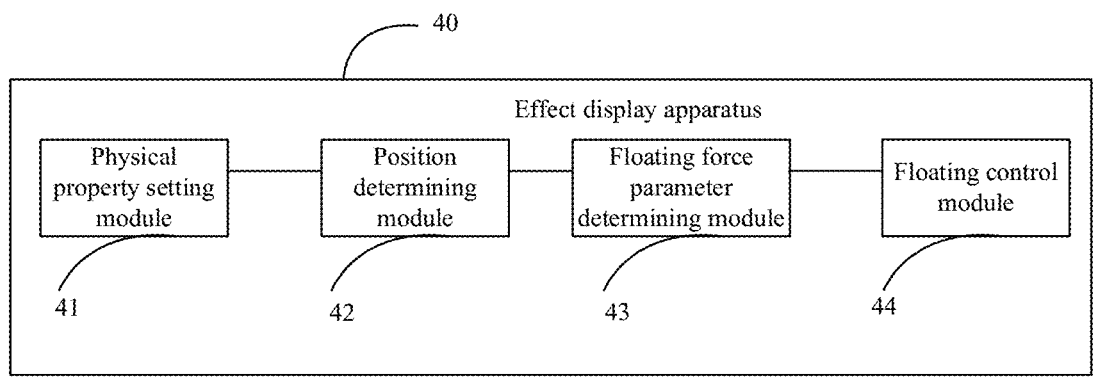
FIG. 4 is a schematic diagram of a structure of an effect display apparatus provided in some embodiments of the present disclosure.

FIG. 4 is a schematic diagram of the structure of an effect display apparatus provided in some embodiments of the present disclosure. The present embodiment can be applicable to the case of adding an effect prop to an instant video. The effect display apparatus can be realized by using software and/or hardware, and can be configured in an electronic device.

As shown in FIG. 4, the effect display apparatus 40 provided in the present embodiment of the disclosure mainly comprises: a physical property setting module 41, a position determining module 42, a floating force parameter determining module 43 and a floating control module 44.

The physical property setting module 41 is configured to set a physical property of a target effect object, wherein the physical property comprises a gravity parameter of the target effect object.

The position determining module 42 is configured to determine a current position and a target position of the target effect object.

The floating force parameter determining module 43 is configured to determine a floating force parameter based on the current position and the target position.

The floating control module 44 is configured to control the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

In some embodiments, the physical property further comprises: linear damping and angular damping.

In some embodiments, the position determining module 42 comprises:
- an initial position determining unit configured to determine a mouth position in an acquired facial image as an initial position of the target effect object; and
- a target position determining unit configured to determine the target position of the target effect object based on the initial position and a preset offset.

Specifically, the floating force parameter comprises a floating force direction and a floating force magnitude, the floating force direction is obtained by a difference between the current position and the target position, the floating force magnitude is preset and the current position is the position of the target effect object in a current video frame.

In some embodiments, the current position is determined by at least one of the following parameters:
- a floating force applied to the target effect object in a previous video frame;
- a first collision force generated by a face collision in the previous video frame; or
- a second collision force generated by an effect border collision in the previous video frame.

In some embodiments, the effect display apparatus further comprises: a rotation control module, configured to control the target effect object to rotate at an angular velocity, when controlling the target effect object to move from the initial position to the target position.

Specifically, a process of determining the angular velocity comprises: obtaining a current angle of the target effect object in the current video frame; taking a difference of the current angle and a preset angle as an angle difference; and determining the angular velocity based on the angle difference and a preset velocity value.

In some embodiments, the floating control module 44 comprises:
- a head movement detecting unit configured to detect in real-time whether a head of a target user moves after the target effect object is controlled to move from the initial position to the target position; a floating control unit configured to control the target effect object to follow the head of the target user to move when the head movement of the target user is detected. Specifically, when a head movement of the target user is detected, the target effect object is controlled to follow the head of the target user to float based on the physical property and a new floating force parameter and according to the kinematic model, wherein the new floating force parameter is determined by a disturbance force parameter generated by the head movement of the target user.

Specifically, the new floating force parameter is determined by using the following method: determining a new target position based on the current position, a preset offset, and the disturbance force parameter; and determining the new floating force parameter based on the current position and the new target position.

Specifically, the disturbance force parameter generated by the head movement of the target user is determined by using the following method: obtaining a first head position of the target user in a current video frame and second head positions of the target user in N video frames before the current video frame, wherein N is a positive integer; determining differences of the first head position and the second head positions as a position difference vector; determining a numerical value corresponding to the position difference vector as a magnitude of the disturbance force; and determining a direction of the position difference vector as a direction of the disturbance force.

In some embodiments, the effect display apparatus further comprises: a quantity determining module configured to determine a number of the target effect object before the detecting in real-time whether the head of the target user moves; a head movement detecting module configured to detect in real-time whether the head of the target user moves, in response to the number of the target effect object reaching a preset number.

In some embodiments, the effect display apparatus further comprises:
- an action completion judging module configured to detect whether a mouth of a target user has completed a specified action based on an acquired facial image;
- an initial state display module configured to display an effect object in an initial state in response to the mouth of the target user completing the specified action;
- a keeping duration obtaining unit configured to obtain a keeping duration of completing the specified action by the mouth;

a display state adjusting module configured to adjust a display state of the effect object based on the keeping duration; and a target effect object generating unit configured to generate the target effect object in response to the keeping duration reaching a preset duration.

In some embodiments, the effect display apparatus further comprises:

a current state display module configured to display the effect object in a current state in response to the keeping duration not reaching the preset duration and the mouth of the target user has not completed the specified action; and a prompt information display module configured to display prompt information, wherein the prompt information is configured to prompt the target user to continue completing the specified action.

In some embodiments, the effect display apparatus further comprises: a map blending module configured to blend a pre-acquired MatCap map and a pre-acquired PBR material map to obtain a final blended map; an effect object generating module configured to add a transparency effect and a lighting effect to the final blended map to obtain the effect object.

The MatCap map comprises a MatCap candy map, a MatCap detail map, and a MatCap highlight map. The map blending module comprises: a first blending unit configured to blend the PBR material map with the MatCap detail map to obtain a first blended map; a second blending unit configured to blend the first blended map with the MatCap highlight map to obtain a second blended map; and a final blending unit configured to blend the second blended map with the MatCap candy map to obtain the final blended map.

The effect display apparatus provided in the present embodiment of the disclosure can execute the steps executed in the effect display method provided in the embodiments of the method of the present disclosure. The specific executing steps and beneficial effects will not be elaborated herein.

Figure 5:
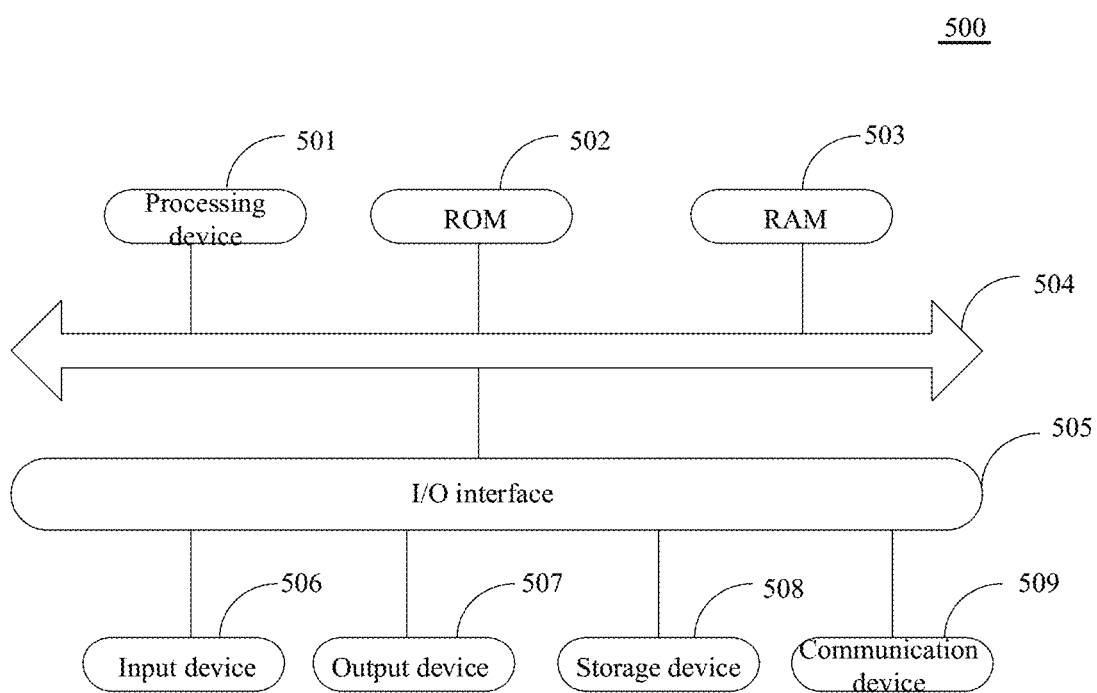
FIG. 5 is a schematic diagram of a structure of an electronic device provided in the embodiments of the present disclosure.

FIG. 5 is a schematic diagram of the structure of an electronic device provided in the embodiments of the present disclosure. With reference to FIG. 5, which illustrates a schematic diagram of the structure suitable for realizing the electronic device 500 in the present embodiment of the disclosure. The electronic device 500 in the present embodiment may comprise, but not limited to, mobile terminals such as mobile phone, laptop, digital broadcast receiver, PDA (personal digital assistant), PAD (tablet), PMP (portable multimedia player), car-mounted terminal (such as car-mounted navigation terminal), wearable terminal device, etc., and fixed terminals such as digital TV, desktop computer, smart home device, etc. The electronic device shown in FIG. 5 is only an example and should not impose any limitations on the scope of use and the functions of the embodiments of the present disclosure.

As shown in FIG. 5, the electronic device 500 may comprise a processing device (such as Central Processing Unit, graphics processor, etc.) 501, which may execute various appropriate actions and processes based on a program stored in Read-Only Memory (ROM) 502 or a program loaded from a storage device 508 into Random Access Memory (RAM) 503 so as to implement the image rendering method according to the embodiments of the present disclosure. In RAM 503, various programs and data required for operations of the terminal equipment 500 are also stored. The processing device 501, ROM 502, and RAM 503 are connected to each other through a bus 504. Input/output (I/O) interface 505 is also connected to the bus 504

Typically, the following devices can be connected to the I/O interface 505: an input device 506 comprising, for example, touch screen, touchpad, keyboard, mouse, camera, microphone, accelerometer, gyroscope, etc.; an output device 507 comprising, for example, liquid crystal display (LCD), speaker, vibrator, etc.; a storage device 508 comprising, for example, magnetic tape, hard disk, etc.; and a communication device 509. The communication device 509 can allow the terminal equipment 500 to communicate wirelessly or wiredly with other equipment to exchange data. Although FIG. 5 illustrates terminal equipment 500 with various devices, it should be understood that it is not required to implement or have all the shown devices. As an alternative, more or fewer devices can be implemented or equipped.

Specifically, according to the embodiments of the present disclosure, the process described above with reference to the flowchart can be realized as a computer software program. For example, the embodiments of the present disclosure comprise a computer program product, comprising a computer program carried on a non-transient computer-readable medium, wherein the computer program comprises program codes for executing the method shown in the flowchart, thereby implementing the page redirection method as described above. In such embodiments, the computer program can be downloaded and installed from the network through the communication device 509, or be installed from the storage device 508, or be installed from ROM 502. When the computer program is executed by the processing device 501, the above functions defined in the methods of the embodiments of the present disclosure are executed.

It should be noted that the above computer-readable medium in the present disclosure can be a computer-readable signal medium, a computer-readable storage medium, or any combination of both. The computer-readable storage medium may be, but not limited to, an electrical, magnetic, optical, electromagnetic, infrared, or semiconductor system, device, or component, or any combination thereof. More specific examples of the computer-readable storage medium may comprise, but not limited to: electrical connection with one or more wires, portable computer disk, hard disk, Random Access Memory (RAM), Read-Only Memory (ROM), Erasable Programmable Read-Only Memory (EPROM or flash), fiber optic, Portable Compact Disk Read-Only Memory (CD-ROM), optical storage device, magnetic storage device, or any suitable combination thereof. In the present disclosure, the computer-readable storage medium may be any tangible medium containing or storing a program, which may be used by or in combination with an instruction execution system, device, or component. In the present disclosure, the computer-readable signal medium may comprise a data signal propagated in baseband or as a part of carrier wave, in which computer-readable program codes are carried. This type of propagated data signal can take various forms, comprising but not limited to electromagnetic signal, optical signal, or any suitable combination thereof. The computer-readable signal medium can also be any computer-readable medium other than the computer-readable storage medium, wherein the computer-readable signal medium can send, propagate, or transmit a program used by, or in combination with an instruction execution system, device, or component. The program codes contained in the computer-readable media can be transmitted using any appropriate medium, comprising but not limited to: wire, optical cable, RF (Radio Frequency), etc., or any suitable combination thereof.

In some implementations, clients and servers can communicate using any currently known or future developed network protocol, such as HTTP (HyperText Transfer Protocol), and can interconnect with any form or medium of digital data communication (such as communication network). Examples of the communication network comprise Local Area Network ("LAN"), Wide Area Network ("WAN"), internet (for example, the Internet), and end-to-end network (for example, ad hoc end-to-end network), as well as any currently known or future developed network.

The above computer-readable media may be comprised in the electronic device mentioned above; or exist separately without being assembled into the electronic device.

The above computer-readable media carry one or more programs, and when the above one or more programs are executed by terminal equipment, cause the terminal equipment to set a physical property of a target effect object, wherein the physical property comprises a gravity parameter of the target effect object; determine a current position and a target position of the target effect object; determine a floating force parameter based on the current position and the target position; control the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

In some embodiments, when the above one or more programs are executed by the terminal equipment, the terminal equipment may also execute other steps as described in the above embodiments.

Computer program codes for executing operations of the present disclosure may be written in one or more programming languages or combinations thereof, comprising but not limited to object-oriented programming languages such as Java, Smalltalk, C++, and conventional procedural programming languages such as C or similar programming languages. Program codes can be completely executed on a user computer, partially executed on a user computer, executed as an independent software package, partially executed on a user computer and partially executed on a remote computer, or completely executed on a remote computer or server. In the case relating to a remote computer, the remote computer can connect to a user computer through any type of network, comprising Local Area Network (LAN) or Wide Area Network (WAN), or can connect to an external computer (such as using Internet service providers to connect via the Internet).

The flowchart and the block diagram in the accompanying drawings illustrate possible architecture, functions, and operations of the systems, the methods, and the computer program products according to various embodiments of the present disclosure. At this point, each box in the flowchart or block diagram can represent a module, a program segment, or a part of codes that contains one or more executable instructions for implementing a specified logical function. It should also be noted that in some alternative implementations, the functions indicated in the boxes can also occur in an order different from those indicated in the accompanying drawings. For example, two consecutive boxes can in fact be executed in parallel substantially, and sometimes they can also be executed in opposite order, depending on the functionality involved. It should also be noted that each box in the block diagram and/or flowchart, as well as the combination of boxes in the block diagram and/or flowchart, can be implemented using a dedicated hardware-based system that performs specified functions or operations, or can be implemented using a combination of dedicated hardware and computer instructions.

The involved units described in the embodiments of the present disclosure can be realized in a form of software or in a form of hardware, wherein, name of the unit does not constitute a limitation on the unit itself in some situation.

The above functions described herein can be at least partially executed by one or more hardware logic components. For example, non-restrictively, exemplary types of usable hardware logic components comprise: Field Programmable Gate Array (FPGA), Application Specific Integrated Circuit (ASIC), Application Specific Standard Product (ASSP), System on Chip (SOC), Complex Programmable Logic Device (CPLD), and so on.

In the context of the present disclosure, a machine readable medium may be a tangible medium that may contain or store a program to be used by or in combination with an instruction execution system, device, or equipment. The machine readable medium can be a machine readable signal medium or a machine readable storage medium. The machine readable medium may comprise but not limited to an electronic, magnetic, optical, electromagnetic, infrared, or semiconductor system, device, or equipment, or any suitable combination thereof. More specific examples of machine readable storage medium may comprise electrical connection based on one or more lines, portable computer disk, hard disk, Random Access Memory (RAM), Read-Only Memory (ROM), Erasable Programmable Read-Only Memory (EPROM or flash memory), optical fiber, Compact Disc Read-Only Memory (CD-ROM), optical storage device, magnetic storage device, or any suitable combination thereof.

According to some embodiments of the present disclosure, an effect display method is provided, comprising: setting a physical property of a target effect object, wherein the physical property comprises a gravity parameter of the target effect object; determining a current position and a target position of the target effect object; determining a floating force parameter based on the current position and the target position; and controlling the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

In some embodiments, the physical property further comprises: linear damping and angular damping.

In some embodiments, the determining a target position of the target effect object comprises: determining a mouth position in an acquired facial image as an initial position of the target effect object; and determining the target position of the target effect object based on the initial position and a preset offset.

In some embodiments, the floating force parameter comprises a floating force direction and a floating force magnitude, the floating force direction is obtained by a difference between the current position and the target position, the floating force magnitude is preset and the current position is the position of the target effect object in a current video frame.

In some embodiments, the current position is determined by at least one of the following parameters: a floating force applied to the target effect object in a previous video frame; a first collision force generated by a face collision in the previous video frame; or a second collision force generated by an effect border collision in the previous video frame.

In some embodiments, the method further comprises: controlling the target effect object to rotate at an angular velocity, when controlling the target effect object to float, based on the physical property and the floating force parameter and according to the kinematic model.

In some embodiments, a process of determining the angular velocity comprises: obtaining a current angle of the target effect object in the current video frame; taking a difference of the current angle and a preset angle as an angle difference; and determining the angular velocity based on the angle difference and a preset velocity value.

In some embodiments, the controlling the target effect object to float to display the floating animation effect of the target effect object, based on the physical property and the floating force parameter and according to the kinematic model comprises: detecting in real-time whether a head of a target user moves; and controlling the target effect object to follow the head of the target user to float, in response to detecting a head movement of the target user, based on the physical property and a new floating force parameter and according to the kinematic model, wherein the new floating force parameter is determined by a disturbance force parameter generated by the head movement of the target user.

In some embodiments, the new floating force parameter is determined by using the following method: determining a new target position based on the current position, a preset offset, and the disturbance force parameter; and determining the new floating force parameter based on the current position and the new target position.

In some embodiments, the disturbance force parameter generated by the head movement of the target user is determined by using the following method: obtaining a first head position of the target user in a current video frame and second head positions of the target user in N video frames before the current video frame, wherein N is a positive integer; determining differences of the first head position and the second head positions as a position difference vector; determining a numerical value corresponding to the position difference vector as a magnitude of the disturbance force; and determining a direction of the position difference vector as a direction of the disturbance force.

In some embodiments, the method further comprises, before the detecting in real-time whether the head of the target user moves: determining a number of the target effect object; and in response to the number of the target effect object reaching a preset number, detecting in real-time whether the head of the target user moves.

In some embodiments, the method further comprises: detecting whether a mouth of a target user has completed a specified action based on an acquired facial image; displaying an effect object in an initial state in response to the mouth of the target user completing the specified action; obtaining a keeping duration of completing the specified action by the mouth; adjusting a display state of the effect object based on the keeping duration; and generating the target effect object in response to the keeping duration reaching a preset duration.

In some embodiments, the method further comprises: displaying the effect object in a current state in response to the keeping duration not reaching the preset duration and the mouth of the target user has not completed the specified action; and displaying prompt information, wherein the prompt information is configured to prompt the target user to continue completing the specified action.

In some embodiments, the method further comprises: blending a pre-acquired MatCap map and a pre-acquired PBR material map to obtain a final blended map; and adding a transparency effect and a lighting effect to the final blended map to obtain the effect object.

In some embodiments, the MatCap map comprises a MatCap candy map, a MatCap detail map, and a MatCap highlight map and the blending the pre-acquired MatCap map and the pre-acquired PBR material map to obtain the final blended map comprises: blending the PBR material map with the MatCap detail map to obtain a first blended map; blending the first blended map with the MatCap highlight map to obtain a second blended map; and blending the second blended map with the MatCap candy map to obtain the final blended map.

According to some embodiments of the present disclosure, an effect display apparatus is provided, wherein the device comprises: a physical property setting module configured to set a physical property of a target effect object, wherein the physical property comprises a gravity parameter of the target effect object; a position determining module configured to determine a current position and a target position of the target effect object; a floating force parameter determining module configured to determine a floating force parameter based on the current position and the target position; a floating control module configured to control the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

In some embodiments, the physical property further comprise linear damping and angular damping.

In some embodiments, the position determining module comprises: an initial position determining unit configured to determine a mouth position in an acquired facial image as an initial position of the target effect object; and a target position determining unit configured to determine the target position of the target effect object based on the initial position and a preset offset.

In some embodiments, the floating force parameter comprises a floating force direction and a floating force magnitude, the floating force direction is obtained by a difference between the current position and the target position, the floating force magnitude is preset and the current position is the position of the target effect object in a current video frame.

In some embodiments, the current position is determined by at least one of the following parameters: a floating force applied to the target effect object in a previous video frame; a first collision force generated by a face collision in the previous video frame; or a second collision force generated by an effect border collision in the previous video frame.

In some embodiments, the effect display apparatus further comprises: a rotation control module, configured to control the target effect object to rotate at an angular velocity, when controlling the target effect object to move from the initial position to the target position In some embodiments, a process of determining the angular velocity comprises: obtaining a current angle of the target effect object in the current video frame; taking a difference of the current angle and a preset angle as an angle difference; and determining the angular velocity based on the angle difference and a preset velocity value.

In some embodiments, the floating control module comprises: a head movement detecting unit configured to detect in real-time whether a head of a target user moves after the target effect object is controlled to move from the initial position to the target position; a floating control unit configured to control the target effect object to follow the head of the target user to move when the head movement of the target user is detected.

In some embodiments, the new floating force parameter is determined by using the following method: determining a new target position based on the current position, a preset offset, and the disturbance force parameter; and determining the new floating force parameter based on the current position and the new target position.

In some embodiments, the disturbance force parameter generated by the head movement of the target user is determined by using the following method: obtaining a first head position of the target user in a current video frame and second head positions of the target user in N video frames before the current video frame, wherein N is a positive integer; determining differences of the first head position and the second head positions as a position difference vector; determining a numerical value corresponding to the position difference vector as a magnitude of the disturbance force; and determining a direction of the position difference vector as a direction of the disturbance force.

In some embodiments, the effect display apparatus further comprises: a quantity determining module configured to determine a number of the target effect object before the detecting in real-time whether the head of the target user moves; a head movement detecting module configured to detect in real-time whether the head of the target user moves, in response to the number of the target effect object reaching a preset number.

In some embodiments, the effect display apparatus further comprises: an action completion judging module configured to detect whether a mouth of a target user has completed a specified action based on an acquired facial image; an initial state display module configured to display an effect object in an initial state in response to the mouth of the target user completing the specified action; a keeping duration obtaining unit configured to obtain a keeping duration of completing the specified action by the mouth; a display state adjusting module configured to adjust a display state of the effect object based on the keeping duration; and a target effect object generating unit configured to generate the target effect object in response to the keeping duration reaching a preset duration.

In some embodiments, the effect display apparatus further comprises: a current state display module configured to display the effect object in a current state in response to the keeping duration not reaching the preset duration and the mouth of the target user has not completed the specified action; and a prompt information display module configured to display prompt information, wherein the prompt information is configured to prompt the target user to continue completing the specified action.

In some embodiments, the effect display apparatus further comprises: a map blending module configured to blend a pre-acquired MatCap map and a pre-acquired PBR material map to obtain a final blended map; an effect object generating module configured to add a transparency effect and a lighting effect to the final blended map to obtain the effect object.

In some embodiments, the MatCap map comprises: a MatCap candy map, a MatCap detail map, and a MatCap highlight map. The map blending module comprises: a first blending unit configured to blend the PBR material map with the MatCap detail map to obtain a first blended map; a second blending unit configured to blend the first blended map with the MatCap highlight map to obtain a second blended map; and a final blending unit configured to blend the second blended map with the MatCap candy map to obtain the final blended map.

According to some embodiments of the present disclosure, an electronic device is provided, comprising:
 one or more processors;
 a storage device for storing one or more programs;
 wherein when the one or more programs are executed by the one or more processors, cause the one or more processors to implement the effect display method as provided in any of the aforementioned embodiments.

According to some embodiments of the present disclosure, a non-transitory computer-readable storage medium is provided, in which a computer program is stored, wherein the program, when executed by a processor, cause the processor to implement the effect display method as provided in any of the aforementioned embodiments.

According to some embodiments of the present disclosure, a computer program product is provided, the computer program product comprising a computer program or instruction, wherein the computer program or instruction, when executed by a processor, cause the processor to implement the effect display method as described in any of the aforementioned embodiments.

According to some embodiments of the present disclosure, a computer program is provided, comprising: instructions, wherein the instructions, when executed by a processor, cause the processor to implement the effect display method as described in any of the aforementioned embodiments.

The above descriptions are only for explaining the preferred embodiments of the present disclosure and the technical principles employed herein. Those skilled in the art should understand that the disclosing scope of the present disclosure is not limited to technical solutions formed by specific combinations of the aforementioned technical features, and meanwhile should also cover other technical solutions formed by arbitrary combinations of the aforementioned technical features or their equivalent features without departing from the disclosed concept mentioned above. For example, a technical solution formed by replacing the aforementioned features with technical features having functions similar to those disclosed (but not limited to) in the present disclosure.

Furthermore, although the operations are depicted in a specific order, this should not be understood as requiring them to be executed in the specific order shown herein or in sequential order. In certain environments, multitasking and parallel processing may be advantageous. Similarly, although several specific implementation details are comprised in the above discussion, these should not be construed as limitations on the scope of this disclosure. Some features described in the context of individual embodiments can also be combined to be implemented in a single embodiment. On the contrary, various features described in the context of a single embodiment can also be implemented in multiple embodiments separately or in any suitable sub-combination.

Although the subject matter has been described in language specific to structural features and/or method logical actions, it should be understood that the subject matter defined in the attached claims may not necessarily be limited to the specific features or actions described above. On the contrary, the specific features and actions described above are only exemplary forms of implementing the claims.

The invention claimed is:

1. An effect display method, comprising:
   blending a pre-acquired MatCap map and a pre-acquired PBR material map to obtain a final blended map; and
   adding a transparency effect and a lighting effect to the final blended map to obtain an effect object;
   detecting whether a mouth of a target user has completed a specified action based on an acquired facial image;
   displaying the effect object in an initial state in response to the mouth of the target user completing the specified action;
   obtaining a keeping duration of completing the specified action by the mouth;
   adjusting a display state of the effect object based on the keeping duration;
   generating a target effect object in response to the keeping duration reaching a preset duration;
   setting a physical property of the target effect object, wherein the physical property comprises a gravity parameter of the target effect object;
   determining a current position and a target position of the target effect object;
   determining a floating force parameter based on the current position and the target position; and
   controlling the target effect object to float to display a floating animation effect of the target effect object, based on the physical property and the floating force parameter and according to a kinematic model, wherein the kinematic model is configured to analyze a motion state of an object with the physical property under a floating force indicated by the floating force parameter.

2. The effect display method according to claim 1, wherein the physical property further comprises:
   linear damping and angular damping.

3. The effect display method according to claim 1, wherein the determining a target position of the target effect object comprises:
   determining a mouth position in an acquired facial image as an initial position of the target effect object; and
   determining the target position of the target effect object based on the initial position and a preset offset.

4. The effect display method according to claim 1, wherein the floating force parameter comprises a floating force direction and a floating force magnitude, the floating force direction is obtained by a difference between the current position and the target position, the floating force magnitude is preset and the current position is the position of the target effect object in a current video frame.

5. The effect display method according to claim 4, wherein the current position is determined by at least one of the following parameters:
   a floating force applied to the target effect object in a previous video frame;
   a first collision force generated by a face collision in the previous video frame; or
   a second collision force generated by an effect border collision in the previous video frame.

6. The effect display method according to claim 1, further comprising:
   controlling the target effect object to rotate at an angular velocity, when controlling the target effect object to float, based on the physical property and the floating force parameter and according to the kinematic model.

7. The effect display method according to claim 6, wherein a process of determining the angular velocity comprises:
   obtaining a current angle of the target effect object in the current video frame;
   taking a difference of the current angle and a preset angle as an angle difference; and
   determining the angular velocity based on the angle difference and a preset velocity value.

8. The effect display method according to claim 1, wherein the controlling the target effect object to float to display the floating animation effect of the target effect object, based on the physical property and the floating force parameter and according to the kinematic model comprises:
   detecting in real-time whether a head of the target user moves; and
   controlling the target effect object to follow the head of the target user to float, in response to detecting a head movement of the target user, based on the physical property and a new floating force parameter and according to the kinematic model, wherein the new floating force parameter is determined by a disturbance force parameter generated by the head movement of the target user.

9. The effect display method according to claim 8, wherein the new floating force parameter is determined by using the following method:
   determining a new target position based on the current position, a preset offset, and the disturbance force parameter; and
   determining the new floating force parameter based on the current position and the new target position.

10. The effect display method according to claim 8, wherein the disturbance force parameter generated by the head movement of the target user is determined by using the following method:
    obtaining a first head position of the target user in a current video frame and second head positions of the target user in N video frames before the current video frame, wherein N is a positive integer;
    determining differences of the first head position and the second head positions as a position difference vector;
    determining a numerical value corresponding to the position difference vector as a magnitude of the disturbance force; and
    determining a direction of the position difference vector as a direction of the disturbance force.

11. The effect display method according to claim 8, further comprising, before the detecting in real-time whether the head of the target user moves:
    determining a number of the target effect object; and
    in response to the number of the target effect object reaching a preset number, detecting in real-time whether the head of the target user moves.

12. The effect display method according to claim 1, further comprising:
    displaying the effect object in a current state in response to the keeping duration not reaching the preset duration and the mouth of the target user has not completed the specified action; and
    displaying prompt information, wherein the prompt information is configured to prompt the target user to continue completing the specified action.

13. The effect display method according to claim 1, wherein the MatCap map comprises a MatCap candy map, a MatCap detail map, and a MatCap highlight map and the blending the pre-acquired MatCap map and the pre-acquired PBR material map to obtain the final blended map comprises:
  blending the PBR material map with the MatCap detail map to obtain a first blended map;
  blending the first blended map with the MatCap highlight map to obtain a second blended map; and
  blending the second blended map with the MatCap candy map to obtain the final blended map.

14. An electronic device, comprising:
  one or more processors; and
  a storage device for storing one or more programs, wherein when the one or more programs are executed by the one or more processors, to cause the one or more processors to:
    blend a pre-acquired MatCap map and a pre-acquired PBR material map to obtain a final blended map; and
    add a transparency effect and a lighting effect to the final blended map to obtain an effect object;
    detect whether a mouth of a target user has completed a specified action based on an acquired facial image;
    display the effect object in an initial state in response to the mouth of the target user completing the specified action;
    obtain a keeping duration of completing the specified action by the mouth;
    adjust a display state of the effect object based on the keeping duration;
    generate a target effect object in response to the keeping duration reaching a preset duration;
    set a physical property of the target effect object, wherein the physical property comprises a gravity parameter of the target effect object;
    determine a current position and a target position of the target effect object;
    determine a floating force parameter based on the current position and the target position; and
    control the target effect object to float to display a floating animation effect of the target effect object, based on the physical property and the floating force parameter and according to a kinematic model, wherein the kinematic model is used to analyze a motion state of an object with the physical property under a floating force indicated by the floating force parameter.

15. The electronic device according to claim 14, wherein the physical property further comprises: linear damping and angular damping.

16. The electronic device according to claim 14, wherein the determining a target position of the target effect object comprises:
  determining a mouth position in an acquired facial image as an initial position of the target effect object; and
  determining the target position of the target effect object based on the initial position and a preset offset.

17. The electronic device according to claim 14, wherein the floating force parameter comprises a floating force direction and a floating force magnitude, the floating force direction is obtained by a difference between the current position and the target position, the floating force magnitude is preset and the current position is the position of the target effect object in a current video frame.

18. A non-transitory computer-readable storage medium, in which a computer program is stored, wherein the program, when executed by a processor, cause the processor to:
  blend a pre-acquired MatCap map and a pre-acquired PBR material map to obtain a final blended map; and
  add a transparency effect and a lighting effect to the final blended map to obtain an effect object;
  detect whether a mouth of a target user has completed a specified action based on an acquired facial image;
  display the effect object in an initial state in response to the mouth of the target user completing the specified action;
  obtain a keeping duration of completing the specified action by the mouth;
  adjust a display state of the effect object based on the keeping duration;
  generate a target effect object in response to the keeping duration reaching a preset duration;
  set a physical property of the target effect object, wherein the physical property comprises a gravity parameter of the target effect object;
  determine a current position and a target position of the target effect object;
  determine a floating force parameter based on the current position and the target position; and
  control the target effect object to float motion to display a floating animation effect of the target effect object, based on the physical property and the floating force parameter and according to a kinematic model, wherein the kinematic model is used to analyze a motion state of an object with the physical property under a floating force indicated by the floating force parameter.

* * * * *